US008705827B2

(12) United States Patent
Zhu et al.

(10) Patent No.: US 8,705,827 B2
(45) Date of Patent: Apr. 22, 2014

(54) SCATTER CORRECTION METHODS

(75) Inventors: Lei Zhu, Atlanta, GA (US); Tianye Niu, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 321 days.

(21) Appl. No.: 13/088,134

(22) Filed: Apr. 15, 2011

(65) Prior Publication Data
US 2012/0263360 A1 Oct. 18, 2012

(51) Int. Cl.
*G06K 9/00* (2006.01)

(52) U.S. Cl.
USPC ............ 382/131; 382/128; 382/132; 382/294; 600/425; 378/7

(58) Field of Classification Search
USPC ......... 382/131, 132, 128, 294; 378/7; 600/425
See application file for complete search history.

(56) References Cited

U.S. PATENT DOCUMENTS

| | | | |
|---|---|---|---|
| 6,876,718 B2* | 4/2005 | Tang | 378/7 |
| 7,463,712 B2* | 12/2008 | Zhu et al. | 378/7 |
| 7,532,705 B2* | 5/2009 | Yin et al. | 378/65 |
| 8,111,894 B2* | 2/2012 | Van De Haar | 382/131 |
| 8,144,829 B2* | 3/2012 | Zhu et al. | 378/7 |
| 8,213,694 B2* | 7/2012 | Vaz et al. | 382/128 |
| 8,279,996 B2* | 10/2012 | Allmendinger et al. | 378/4 |
| 8,280,135 B2* | 10/2012 | McCollough et al. | 382/128 |
| 8,363,919 B2* | 1/2013 | Sebok | 382/131 |
| 8,520,974 B2* | 8/2013 | Fujita et al. | 382/275 |
| 2008/0253515 A1* | 10/2008 | Bertram et al. | 378/62 |
| 2009/0225932 A1* | 9/2009 | Zhu et al. | 378/7 |
| 2009/0297010 A1* | 12/2009 | Fritz et al. | 382/131 |
| 2010/0046842 A1* | 2/2010 | Conwell | 382/218 |
| 2010/0049740 A1* | 2/2010 | Iwase et al. | 707/104.1 |
| 2011/0176723 A1* | 7/2011 | Ali et al. | 382/154 |
| 2011/0293161 A1* | 12/2011 | Yi et al. | 382/131 |
| 2012/0207370 A1* | 8/2012 | Fahimian et al. | 382/131 |
| 2012/0263360 A1* | 10/2012 | Zhu et al. | 382/131 |
| 2012/0308100 A1* | 12/2012 | Pack et al. | 382/131 |
| 2013/0108013 A1* | 5/2013 | Leng et al. | 378/19 |

OTHER PUBLICATIONS

Jia, GPU based Fast Low Dose Cone Beam CT Reconstruction via total variation, revised Apr. 9, 2010, Cornell Univ. Library.*
Bai, A generalized model for the conversion from CT Numbers to Linear Attenuation Coefficients, 2003, IEEE Transactions on Nuclear Science, vol. 50, No. 5, p. 1510+.*

* cited by examiner

Primary Examiner — Jayesh A Patel
Assistant Examiner — Iman K Kholdebarin
(74) Attorney, Agent, or Firm — Troutman Sanders LLP; Ryan A. Schneider

(57) ABSTRACT

Described herein are improved methods for correcting cone beam computed tomography signals to reduce scatter contamination contained therein. Generally, the improved methods involve generating a plurality of two-dimensional projection images of a subject from a three-dimensional multi-detector computed tomography image of the subject. This is followed by subtracting the plurality of two-dimensional projection images from a plurality of two-dimensional cone beam projection images of the subject to produce a plurality of two-dimensional estimated error projections that comprise an estimated error in the plurality of two-dimensional cone beam projection images. The plurality of two-dimensional estimated error projection images are subtracted from the plurality of two-dimensional cone beam projection images to generate a plurality of two-dimensional corrected cone beam projection images. A three-dimensional corrected cone beam computed tomography image of the subject is then constructed from the plurality of two-dimensional corrected cone beam projection images.

17 Claims, 9 Drawing Sheets

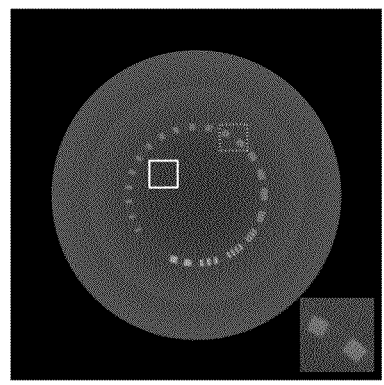 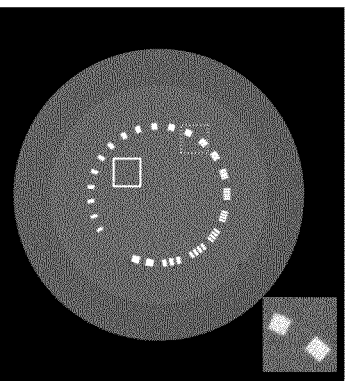
FIGURE 4(a)  FIGURE 4(b)
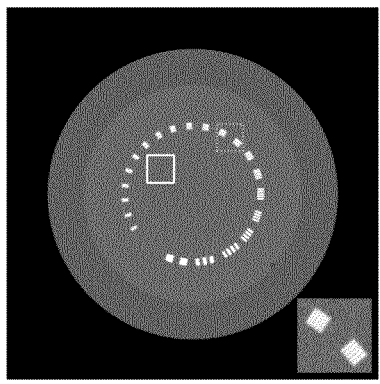 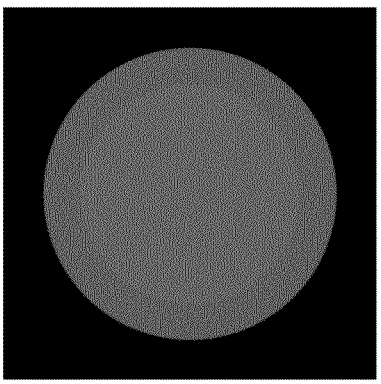
FIGURE 4 (c)  FIGURE 4 (d)

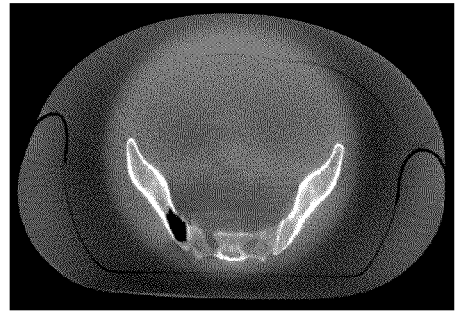 
FIGURE 8(a)  FIGURE 8(b)
 
FIGURE 8(c)  FIGURE 8(d)
FIGURE 9(a)  FIGURE 9(b)

SCATTER CORRECTION METHODS

TECHNICAL FIELD

The various embodiments of the present invention relate generally to methods for correcting X-ray imaging signals, including computed tomography (CT), and more particularly to methods for correcting such signals to reduce scatter contamination.

BACKGROUND

In image-guided radiation therapy (IGRT), on-board X-ray imaging has evolved from two to three dimensions, and cone-beam CT (CBCT) is being increasingly utilized to improve the therapy or treatment performance. CBCT imaging can be performed just before, during, or after treatment without moving the patient and is expected to yield more faithful and relevant patient images at treatment time compared to the planning multi-detector CT (MDCT) images taken before patients start their fractionated radiotherapy regimen. In current clinical practices, CBCT is used mainly to provide positioning information for treatment setup. In such cases, quantitative CBCT images with high CT number accuracies generally are not required. With a Hounsfield unit (HU) calibration, CBCT-based dose calculation achieves a satisfactory accuracy when the scanned objects are small or largely uniform. More demanding applications, including calculation of dose distribution on a complex geometry and tumor delineation for adaptive radiation therapy, however, require high-quality CBCT images. In these cases, applications of CBCT can be hindered by large shading artifacts in the reconstructed images.

The shading artifacts in CBCT images result from several non-idealities, including scattered radiation, beam hardening effects, detector lag, non-linear detector gains and the use of a bow-tie filter. Among these, the artifacts resulting from the severe scatter contamination due to the large size of an illuminated volume are most severe. Scatter signals have dominant low-frequency components in spatial distribution. On a CBCT system, without scatter correction, the scatter-to-primary ratio (SPR) is typically about 2 on a mid-size volume and can be up to about 5 on a human torso. The large scatter signals lead to CT number errors up to about 350 HU.

To overcome these obstacles, many CBCT correction methods have been proposed. These methods can be divided into two major categories: pre-processing and post-processing methods. By way of explanation, the pre-processing methods reduce scatter artifacts by preventing the scattered photons from reaching the detector, while, the post-processing methods involve the application of correction algorithms to scatter-contaminated projection images after a conventional data acquisition. Unfortunately, despite the advancements made in correction methods, there remains a need for improved correction methods. It is to the provision of such methods that the various embodiments of the present inventions are directed.

BRIEF SUMMARY

The various embodiments of the present invention provide improved correction methods for reducing scatter contamination in detected X-ray imaging signals and methods of using such scatter correction methods for image-guided radiation therapy.

An exemplary embodiment of the present invention is a correction method for reducing error in cone beam computed tomography images that includes the generation of a plurality of two-dimensional projection images of a subject from a three-dimensional multi-detector computed tomography image of the subject. The three-dimensional multi-detector computed tomography image of the subject can be spatially registered with a three-dimensional cone beam computed tomography image of the subject. The method can also include subtracting the plurality of two-dimensional projection images from a plurality of two-dimensional cone beam projection images of the subject to result in a plurality of two-dimensional estimated error projections. The plurality of two-dimensional estimated error projections comprises an estimated error in the plurality of two-dimensional cone beam projection images. The plurality of two-dimensional estimated error projection images can then be subtracted from the plurality of two-dimensional cone beam projection images to generate a plurality of two-dimensional corrected cone beam projection images. The method can also include constructing a three-dimensional corrected cone beam computed tomography image of the subject from the plurality of two-dimensional corrected cone beam projection images.

The estimated error in the plurality of two-dimensional cone beam projection images can include low-frequency scattered radiation signals, beam hardening effects, detector lag, and/or detector nonlinear gain.

The method can also involve smoothing the plurality of two-dimensional estimated error projections before generating the plurality of two-dimensional corrected cone beam projection images. The smoothing step generally involves suppressing any boundary discrepancies in the plurality of two-dimensional estimated error projections. The smoothing step can also include reducing a high-frequency component of the estimated error. This high-frequency component of the estimated error can be error in spatial registration resulting from a deformation or change in the subject.

In some exemplary embodiments of the present invention, the three-dimensional cone beam computed tomography image of the subject can be formed from the plurality of two-dimensional cone beam projection images of the subject using a Feldkamp, Davis, and Kress algorithm.

Some exemplary embodiments of the present invention can also include a step of converting the three-dimensional multi-detector computed tomography image of the subject from Hounsfield Units to linear attenuation coefficients followed by spatially registering the converted three-dimensional multi-detector computed tomography image of the subject. The conversion and spatial registration can occur before generating the plurality of two-dimensional multi-detector projection images of the subject.

In some exemplary embodiments of the present invention, the spatial registration involves placing a data set from the converted three-dimensional multi-detector computed tomography image of the subject in a same coordinate system as a data set from the three-dimensional cone beam computed tomography image of the subject. The spatial registration step can also entail aligning a center of mass of the converted three-dimensional multi-detector computed tomography image of the subject with a center of mass of the three-dimensional cone beam computed tomography image of the subject.

In certain situations, the spatial registration can further include calculating a square pixel-wise difference between a volume of the converted three-dimensional multi-detector computed tomography image of the subject with a volume of the three-dimensional cone beam computed tomography image of the subject. Next, a gradient descent search algorithm can be applied to the square pixel-wise difference to determine an amount of rotation and offset for the converted three-dimensional multi-detector computed tomography image of the subject. The converted three-dimensional multi-detector computed tomography image of the subject can be rotated and offset by the amount determined. In some cases, these steps (i.e., the calculating, applying, and rotating and offsetting) can be repeated until the amount determined is below a threshold amount.

In carrying out this method, generation of the plurality of two-dimensional multi-detector projection images of the subject can involve using Siddon's algorithm and Beer's Law.

The three-dimensional corrected cone beam computed tomography image of the subject can be constructed from the plurality of two-dimensional corrected cone beam projection images of the subject using a Feldkamp, Davis, and Kress algorithm.

The method can also include using the three-dimensional corrected cone beam computed tomography image of the subject as an image for image-guided radiation therapy.

According to another exemplary embodiment of the present invention, a correction method for reducing error in cone beam computed tomography images can entail generating a plurality of two-dimensional projection images of a subject from a cone beam computed tomography scan of the subject; constructing a three-dimensional cone beam computed tomography image of the subject from the plurality of two-dimensional cone beam projection images; spatially registering a three-dimensional multi-detector computed tomography image of the subject with the three-dimensional cone beam computed tomography image of the subject; generating a plurality of two-dimensional projection images of the subject from the three-dimensional multi-detector computed tomography image of the subject; subtracting the plurality of two-dimensional multi-detector projection images from the plurality of two-dimensional cone beam projection images to generate a plurality of two-dimensional estimated error projections, wherein the plurality of two-dimensional estimated error projections comprise an estimated error in the plurality of two-dimensional cone beam projection images; subtracting the plurality of two-dimensional estimated error projection images from the plurality of two-dimensional cone beam projection images to generate a plurality of two-dimensional corrected cone beam projection images; and constructing a three-dimensional corrected cone beam computed tomography image of the subject from the plurality of two-dimensional corrected cone beam projection images.

This embodiment can also include smoothing the plurality of two-dimensional estimated error projections before generating the plurality of two-dimensional corrected cone beam projection images. The smoothing step can involve suppressing any boundary discrepancies in the plurality of two-dimensional estimated error projections, and reducing a high-frequency component of the estimated error, wherein the high-frequency component of the estimated error includes error in spatial registration resulting from a deformation or change in the subject.

In some cases using this method, the three-dimensional cone beam computed tomography image of the subject is constructed from the plurality of two-dimensional cone beam projection images of the subject using a Feldkamp, Davis, and Kress algorithm and/or the three-dimensional corrected cone beam computed tomography image of the subject is constructed from the plurality of two-dimensional corrected cone beam projection images of the subject using a Feldkamp, Davis, and Kress algorithm.

This exemplary embodiment of the present invention can further include converting the three-dimensional multi-detector computed tomography image of the subject from Hounsfield Units to linear attenuation coefficients before spatially registering the three-dimensional multi-detector computed tomography image of the subject with the three-dimensional cone beam computed tomography image of the subject.

Spatially registering the three-dimensional multi-detector computed tomography image of the subject with the three-dimensional cone beam computed tomography image of the subject can involve placing a data set from the three-dimensional multi-detector computed tomography image of the subject in a same coordinate system as a data set from the three-dimensional cone beam computed tomography image of the subject. The spatial registration can also involve aligning a center of mass of the three-dimensional multi-detector computed tomography image of the subject with a center of mass of the three-dimensional cone beam computed tomography image of the subject. The spatial registration step can also entail calculating a square pixel-wise difference between a volume of the three-dimensional multi-detector computed tomography image of the subject with a volume of the three-dimensional cone beam computed tomography image of the subject. The spatial registration step can further include applying a gradient descent search algorithm to the square pixel-wise difference to determine an amount of rotation and offset for the three-dimensional multi-detector computed tomography image of the subject. In addition, the spatial registration step can include rotating and offsetting the three-dimensional multi-detector computed tomography image of the subject by the amount determined. In some cases, the three foregoing steps (i.e., the calculating, applying, and rotating and offsetting steps) can be repeated until the amount determined is below a threshold amount.

Generating the plurality of two-dimensional multi-detector projection images of the subject from the three-dimensional multi-detector computed tomography image of the subject can involve using Siddon's algorithm and Beer's Law.

The method can also include using the three-dimensional corrected cone beam computed tomography image of the subject as an image for image-guided radiation therapy.

Other aspects and features of embodiments of the present invention will become apparent to those of ordinary skill in the art, upon reviewing the following detailed description in conjunction with the accompanying figures.

BRIEF DESCRIPTION OF THE DRAWINGS

FIGS. 4(a), 4(b), 4(c) and 4(d) are displays of axial views of the reconstructed Calphan© 600 phantoms using the present invention.

FIGS. 6(a), 6(b) and 6(c) are displays of the sagittal views of the reconstructed Calphan© 600 phantoms using the present invention.

FIGS. 8(a), 8(b), 8(c) and 8(d) are displays of the image reconstructions of the pelvis phantom using the present invention.

FIGS. 9(a) and 9(b) are displays of the sagittal and coronal views of the reconstructed pelvis phantoms using the present invention.

DETAILED DESCRIPTION

Figure 1:
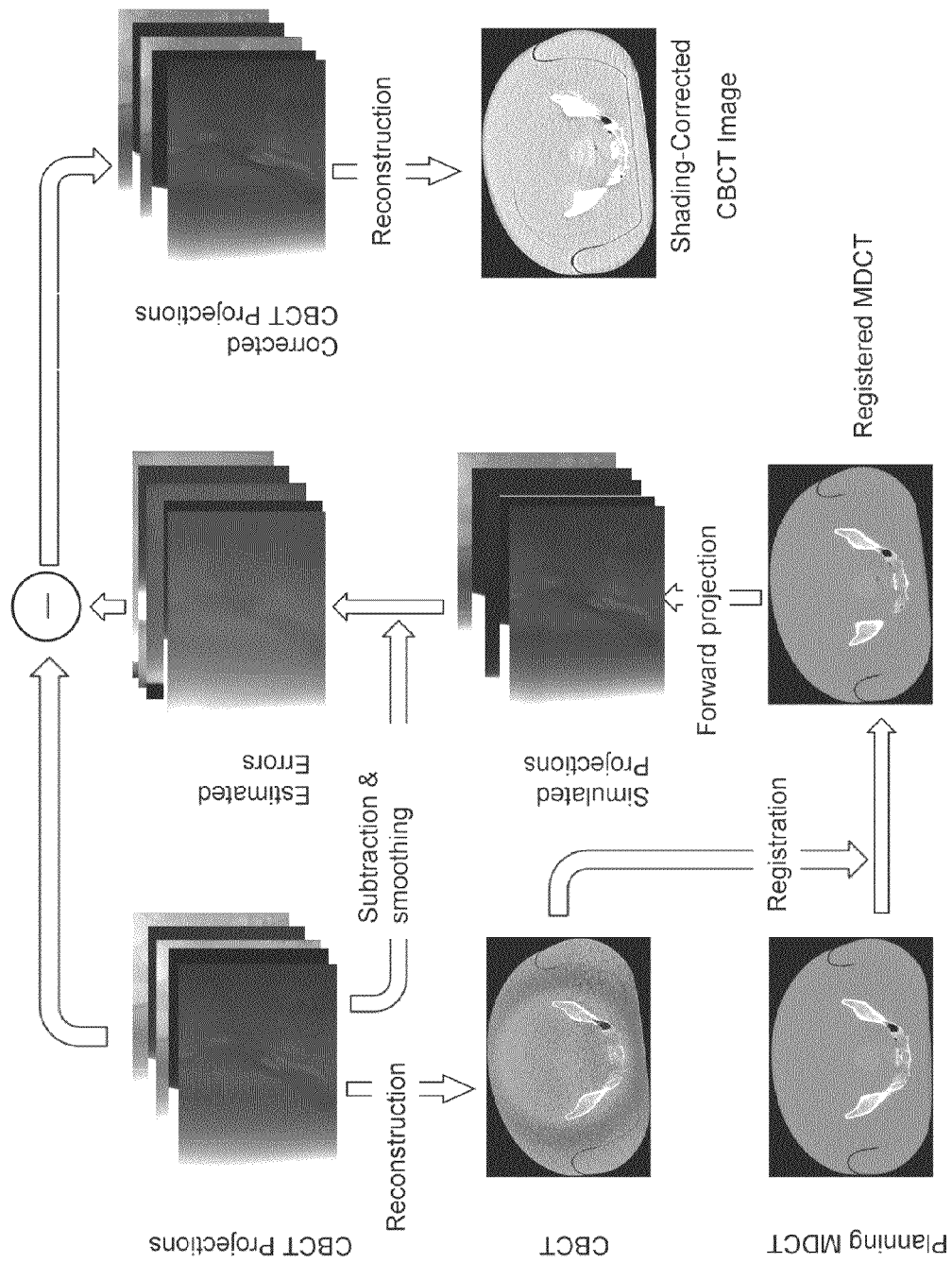
FIG. 1 is a diagram of the workflow of the present invention.

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

As stated above, the various embodiments of the present invention are directed to improved methods for reducing error in CBCT images. In contrast to the existing CBCT correction methods and techniques, the improved methods disclosed herein take advantage of the accuracy of previously-obtained MDCT images to improve the quality of CBCT images. With much smaller inherent scatter signals and more accurate detectors, diagnostic MDCT provides high quality CT images that are routinely used for radiation treatment planning. Using the MDCT image as "free" prior information, the primary projections in the CBCT scan are first estimated via forward projection of the spatially registered MDCT data. Since most of the CBCT shading artifacts stem from low-frequency errors in the projections such as scatter, these errors can be accurately estimated by low-pass filtering the difference between the estimated and raw CBCT projections. The error estimates are then subtracted from the raw CBCT projections. Such methods are distinct from existing correction methods that use the MDCT image because the methods described herein are projection-based and use limited patient anatomical information from the MDCT image. As an advantageous result, the merit of CBCT-based treatment monitoring is therefore retained.

By way of illustration, the methods of the present invention generally include a first step of generating a plurality of two-dimensional (2D) projection images of a subject from a three-dimensional (3D) MDCT image of the subject. As used herein, the term "subject" is intended to encompass at least a portion of a body of a human, animal, or other such object to which the methods of the present invention could be applicable. This step can be accomplished using any existing forward projection algorithm. Those skilled in the art to which this disclosure pertains can readily select and apply an appropriate forward projection technique, including for example ray-driven methods and distance-driven methods. In one non-limiting example, Siddon's ray tracing algorithm can be used to calculate the forward projections of the MDCT image. Other ray-driven methods can include calculating the line integrals by performing linear interpolation between two pixels for each row or column intersected by the projection line, using the nearest-neighbor or no interpolation spherical basis functions, and natural pixels. Other algorithms based on distance-driven methods can be used, which map pixel boundaries and detector boundaries to a common axis and then apply a one-dimensional kernel operation to map data from one set of boundaries to another.

Several non-limiting examples of algorithms that can be used in the registration, projection and reconstruction include W. Zhuang, S. S. Gopal and T. J. Hebert, "Numerical Evaluation of Methods for Computing Tomographic Projections," Ieee T Nucl Sci. 41(4), 1660-1665 (1994); D. C. Yu and S. C. Huang, "Study of Reprojection Methods in Terms of Their Resolution Loss and Sampling Errors," Ieee T Nucl Sci. 40(4), 1174-1178 (1993); K. Mueller, R. Yagel and J. J. Wheller, "Fast implementations of algebraic methods for three-dimensional reconstruction from cone-beam data," Ieee T Med Imaging. 18(6), 538-548 (1999); R. M. Lewitt, "Alternatives to Voxels for Image Representation in Iterative Reconstruction Algorithms," Phys Med Biol. 37(3), 705-716 (1992); Y. L. Hsieh, G. T. Gullberg, G. L. Zeng and R. H. Huesman, "Image reconstruction using a generalized natural pixel basis," Ieee T Nucl Sci. 43(4), 2306-2319 (1996); B. De Man and S. Basu, "Distance-driven projection and back-projection in three dimensions," Phys Med Biol. 49(11), 2463-2475 (2004); J. Wang, T. Li, H. B. Lu and Z. R. Liang, "Penalized weighted least-squares approach to sinogram noise reduction and image reconstruction for low-dose X-ray computed tomography," Ieee T Med Imaging. 25(10), 1272-1283 (2006); N. Li, H. X. Zhao, S. H. Cho, J. G. Choi and M. H. Kim, "A fast algorithm for voxel-based deterministic simulation of X-ray imaging," Comput Phys Commun. 178 (7), 518-523 (2008); and F. Maes, A. Collignon, D. Vandermeulen, G. Marchal and P. Suetens, "Multimodality image registration by maximization of mutual information," Ieee T Med Imaging. 16(2), 187-198 (1997), all of which are herein incorporated by reference.

In exemplary embodiments, the three-dimensional MDCT image can be first spatially registered with a three-dimensional CBCT image of the subject. The spatial registration can minimize the estimated error between estimated and raw CBCT projections caused by anatomical structure. As a result, the error projections can be due mainly to the scatter signals contained in the CBCT projections. Since scatter has dominant low-frequency components, low-pass filtering on the error projections is able to produce accurate scatter estimates of the CBCT projections. Spatial registration can be achieved by any technique known to those of skill in the art to which this disclosure pertains.

Once the plurality of two-dimensional projection images have been calculated from the three-dimensional MDCT image, the plurality of two-dimensional projection images can be subtracted from a plurality of two-dimensional cone beam projection images of the subject. The remaining images can contain essentially only the estimated error in the plurality of two-dimensional cone beam projection images. The resulting images after the subtraction can be a plurality of two-dimensional estimated error projections.

Next, the plurality of two-dimensional estimated error projection images can be subtracted from the plurality of two-dimensional cone beam projection image. This step serves to remove the estimated error from the initial projection images produced from the CBCT scan so as to result in a plurality of two-dimensional corrected cone beam projection images. Finally, a corrected 3D CBCT image of the subject can be prepared from the plurality of two-dimensional corrected cone beam projection images.

In one exemplary embodiment, the method of present invention comprises a first step of generating a plurality of two-dimensional projection images of a subject from a CBCT scan of the subject, then constructing a three-dimensional CBCT image of the subject from the plurality of two-dimensional cone beam projection images.

The three-dimensional CBCT image can be spatially registered with a three-dimensional MDCT image of the subject. The three-dimensional MDCT image of the subject can be obtained at any time. The MDCT image may be acquired before, during, or after the CBCT image. The MDCT is preferably acquired before the CBCT image. When the MDCT image is acquired before the CBCT image, e.g. during the course of treatment planning for radiation therapy patients during preparation of a treatment plan, the MDCT image provides a source of high-quality data that can be used to improve the accuracy of CBCT imaging. When the CBCT image is registered with the MDCT, the CBCT can be fixed as the target and the MDCT can be registered to the CBCT, the MDCT can be fixed as the target and the CBCT can be registered to the MDCT, or a combination of both can be performed. Preferably the CBCT image is fixed and the MDCT is registered to the CBCT.

Once the three-dimensional CBCT image has been spatially registered with the three-dimensional MDCT image of the subject, a plurality of two-dimensional projection images of the subject can be generated from the three-dimensional MDCT image of the subject. The plurality of two-dimensional multidetector projection images of the subject can be subtracted from the two-dimensional cone beam projection images from the subject to generate a plurality of two-dimensional estimated error projections. The plurality of two-dimensional estimated error projections can comprise an estimated error in the plurality of two-dimensional cone beam projections images.

One advantage of the current method is that it provides accurate low-frequency errors (mainly scatter) in the CBCT projections from prior MDCT patient images. Such prior patient images are available in many clinical applications, for example, in the current practice of radiation therapy. With these low-frequency projection errors removed from CBCT projections, an effective correction for both the low- and high-frequency artifacts in the reconstructed images can be obtained. The typical low-frequency range is from about 0 to about 0.03 in terms of normalized frequency for the Nyquist frequency. The typical high-frequency range is from about 0.03 to about 1 in terms of normalized frequency for the Nyquist frequency. Typically, the Nyquist frequency is approximately half the sampling period in the horizontal direction or vertical direction, preferably the horizontal direction because the variation of scatter can occur more often in the horizontal direction. Moreover, while a portion of the image correction is related to scatter, the method can provide shading corrections to images that can be greater than the correction simply related to scatter.

In an example of the embodiment, the plurality of two dimensional estimated error projection images can be subtracted from the plurality of two-dimensional cone beam projection images to generate a plurality of two-dimensional corrected cone beam projection images. Once the plurality of two-dimensional corrected cone beam projected images has been generated, a three-dimensional corrected CBCT image of the subject can be constructed from the plurality of two-dimensional corrected cone beam projection images.

In a preferred embodiment, the plurality of two-dimensional estimated error projections can be smoothed before generating the plurality of two-dimensional corrected cone beam projection images. Smoothing can be conducted using any method known to one of ordinary skill in the art. Smoothing can comprise suppressing any boundary discrepancies in the plurality of two-dimensional estimated error projections, reducing a high-frequency component of the estimated error projections, or both suppressing any boundary discrepancy and reducing the high-frequency component of the estimated error projections. The high-frequency components of estimated error can comprise error in spatial registration, typically resulting from a deformation or change in the subject. In particular, deformation can occur in clinical practice for patient images, which can lead to large registration error. More accurate deformable registration methods can significantly improve registration accuracy, and allows for better scatter correction as disclosed by this method.

In an embodiment of the method, the three-dimensional CBCT and MDCT images are spatially registered. In preferred embodiment the spatial registering comprises first placing a data set from the three-dimensional MDCT image of the subject in a same coordinate system as a data set from the three-dimensional CBCT image of the subject, aligning a center of mass of the three-dimensional MDCT image of the subject with a center of mass of the three-dimensional CBCT image of the subject; calculating a square pixel-wise difference between a volume of the three-dimensional MDCT image of the subject with a volume of the three-dimensional CBCT image of the subject; applying a gradient descent search algorithm to the square pixel-wise difference to determine an amount of rotation and offset for the three-dimensional DMCT image of the subject; and rotating and offsetting the three-dimensional MDCT image of the subject by the amount determined. The steps of calculating a square pixel-wise difference, applying a gradient descent search algorithm, and rotating and offsetting the three-dimensional MDCT image can be repeated until the amount determined is below a threshold amount.

In another embodiment the method can be repeated one or more times to further reduce error in the CBCT image, in iterations, until a desired amount of accuracy is achieved. For example, the method can be conducted two times, three times, four times, or more, until the desired level of accuracy is achieved. For example, a CBCT image can be collected and processed using the method and the three-dimensional corrected CBCT image produced for the first iteration. For the second iteration, the three-dimensional corrected CBCT image can be resubmitted to the method and spatially registered with the three-dimensional MDCT image. The plurality of two-dimensional projection images can be subtracted from a plurality of the two-dimensional first-iteration corrected cone beam projection images, resulting in a plurality of two-dimensional second-iteration estimated error projection images. The plurality of two-dimensional second-iteration estimated error projection images can then be subtracted from plurality of two-dimensional first-iteration cone beam projection images to generate a plurality of two-dimensional second-iteration corrected cone beam projection images. A three-dimensional second-iteration corrected CBCT image can then be constructed from a plurality of two-dimensional second-iteration corrected cone beam projection images.

Various embodiments of the present invention are further illustrated by the following non-limiting examples.

EXAMPLES

The method was evaluated using two phantom studies on CBCT tabletop systems. An evaluation phantom, Calphan©600, was used in the first study, and a detailed quantitative image analysis was carried out on the phantom inserts. The second study used an anthropomorphic pelvis phantom, for which shading correction was more challenging due to the high SPR and object heterogeneity.

For simplicity of description, the shading correction algorithm was derived assuming that scatter was the only source of errors in the projections while noting that other low-frequency errors from, for example, beam hardening effects and detector nonlinearities were also corrected.

The MDCT scanner was assumed a detector of 16 slices or less, with negligible scatter signals. With an anti-scatter collimator, the maximum SPR of MDCT was estimated to be on the order of ~0.01. MDCT reconstruction algorithms can incorporate scatter, beam hardening and empirical uniformity corrections of their own to improve CT number accuracies. So, MDCT-based improvement of CBCT images required a compromise between reducing shading artifacts and faithfully retaining anatomic information. It was desired to accurately estimate CBCT scatter signals from the MDCT images without carrying over anatomical information. To achieve this goal, differences between the CBCT and the MDCT images of the same patient were first reduced using image registration, with the intent that any residual patient deformations would lead largely to high-frequency primary signal differences in the projection domain. Since scatter signals have dominant low-frequency components, it is possible to accurately estimate scatter in the CBCT scan from the registered MDCT image while still preserving patient anatomy.

FIG. 1 shows the workflow of the shading correction algorithm, present invention using planning MDCT images (the projections shown are acquired in a half-fan mode.) The planning MDCT image was first calibrated from HU to linear attenuation coefficients as if it were acquired in a scatter-free CBCT system. To obtain the calibration formula, a calibration phantom was first scanned in the MDCT system to generate a MDCT volume in HU. A CBCT scan was carried out on the same phantom with a narrowly opened collimator—a fan-beam equivalent geometry where scatter is inherently suppressed, and reconstructed in mm-1. Note that the fan-beam scan, employed to obtain reference images in this study, was different from the MDCT scan, which is often called "fan-beam CT" by some researchers. Based on the CBCT and the MDCT reconstruction values in the same regions of interest (ROIs), an affine function was obtained and used as the calibration formula. The calibrated MDCT image was then spatially registered to the CBCT image, which was reconstructed from the raw projections using a standard algorithm. After that, the estimated CBCT primary signals were obtained via forward projection of the registered MDCT data and Beer's law. For a given projection angle, subtraction of the simulated primary projection from the raw CBCT projection gave the (generally low frequency) scatter signals plus any primary signal differences between the MDCT and the CBCT scans. These primary signal differences were mainly high frequency due to registration errors from patient deformation. Scatter signals were therefore estimated from these difference images by low frequency filtering or smoothing. Finally, the estimated scatter was subtracted from the raw CBCT projections and scatter-corrected CBCT images were reconstructed. Note that, as a post-processing method, the algorithm cannot estimate high-frequency statistical errors in the projections and scatter noise was, consequently, left in the corrected images.

Implementation Details

The Insight Toolkit (ITK) software (www.itk.org) was used in the registration step. Rigid registration was implemented in the phantom studies presented in this work. The mean square value of voxel-wise differences between the volumes was calculated as the cost function, and a rotation matrix and a 3D translational vector were defined as the parameters to describe the 3D rigid motion. Both MDCT and CBCT datasets were first placed in the same coordinate system and their centers of mass are aligned. A gradient descent search algorithm was implemented for optimization. The optimization goal is reached after approximately 50 iterations.

For an early-stage demonstration of the concept, other steps of the scatter correction algorithm were implemented in Matlab. The forward projections of the planning MDCT were calculated using Siddon's ray tracing algorithm, which obtained the integral of each ray by adding up the products of intensities of voxels and intersected lengths of the ray with voxels on the path. Since the scatter distributions was expected to be low-frequency dominant, high-resolution image processing is unnecessary. To save computation, the estimated CBCT projections were acquired with a down-sampling factor of 4 in each dimension. The estimated scatter was finally up-sampled to full resolution for scatter correction. Since low-resolution projections were used in the algorithm, the stairstep and aliasing artifacts generated in the forward projection step did not have noticeable effects on the final scatter estimates.

The performance of the algorithm was mainly determined by the smoothing step of generating the estimated scatter. In our implementations, a 2D median filter, with a width of 51-by-51 pixels (19.9-by-19.9 mm on the detector), was used to suppress the boundary discrepancy in the difference images of the raw and the estimated CBCT projections. A low-pass 2D Gaussian filter, with a window size of 71-by-71 pixels (27.7-by-27.7 mm) and a standard deviation of 3 pixels (1.2 mm), was then applied to further reduce the high-frequency primary difference without affecting the low-frequency scatter signals. The parameters of these filters were empirically chosen in this study. Note that the kernel width of the smoothing filter was not very large, because although scatter has a low-frequency response to primary signals, scatter distributions still contain large high-frequency components where primary signals have sharp transitions, such as at object boundaries.

An example of signal processing in the projection domain is shown in FIGS. 2(a), 2(b), 2(c) and 2(d). These figures displays of cone beam projections and scattering estimates using the present invention: (a) cone-beam projection without correction; (b) full-resolution forward projection of the registered MDCT; (c) estimated scatter distribution; (d) cone-beam projection after correction. The display windows are set to be (in detector units) (a) [0 3000]; (b) [0 2500]; (c) [0 1000]; and (d) [0 2500]. In c), the mean value of scatter estimates inside the phantom is 90 detector units and the standard deviation is 4 detector units. The scatter signal increase around the object boundary is by a factor of ~30.

Figure 2A:
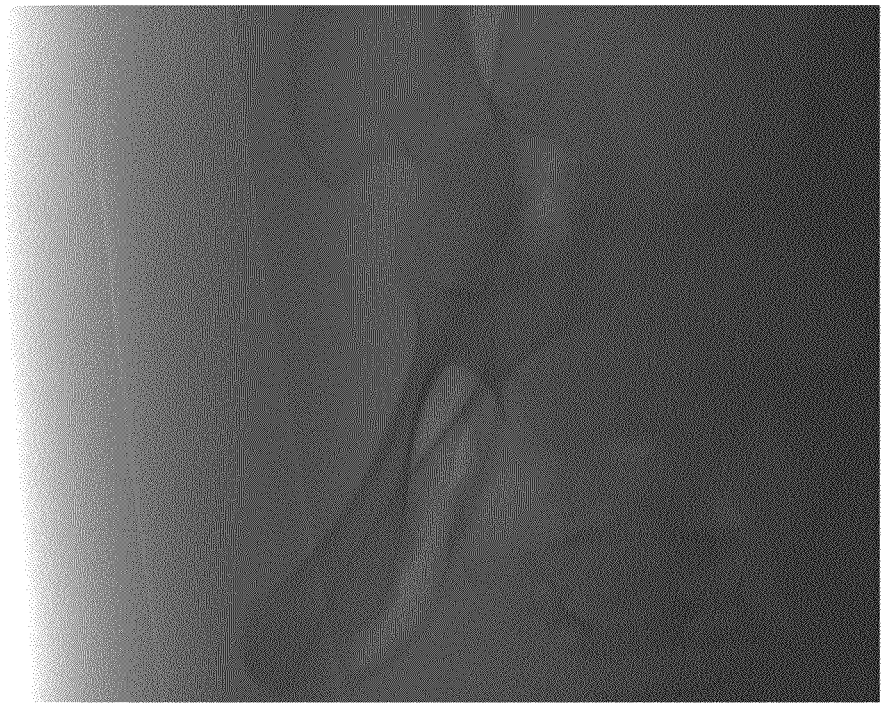
FIGS. 2(a), 2(b), 2(c) and 2(d) are displays of cone beam projections and scattering estimates using the present invention.
Figure 2B:
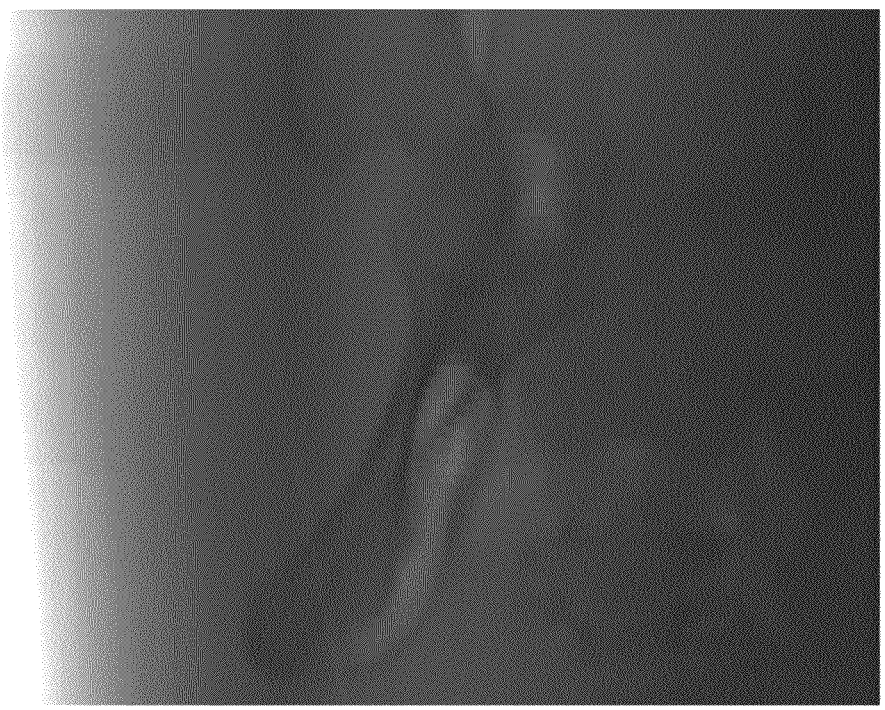
Figure 2C:
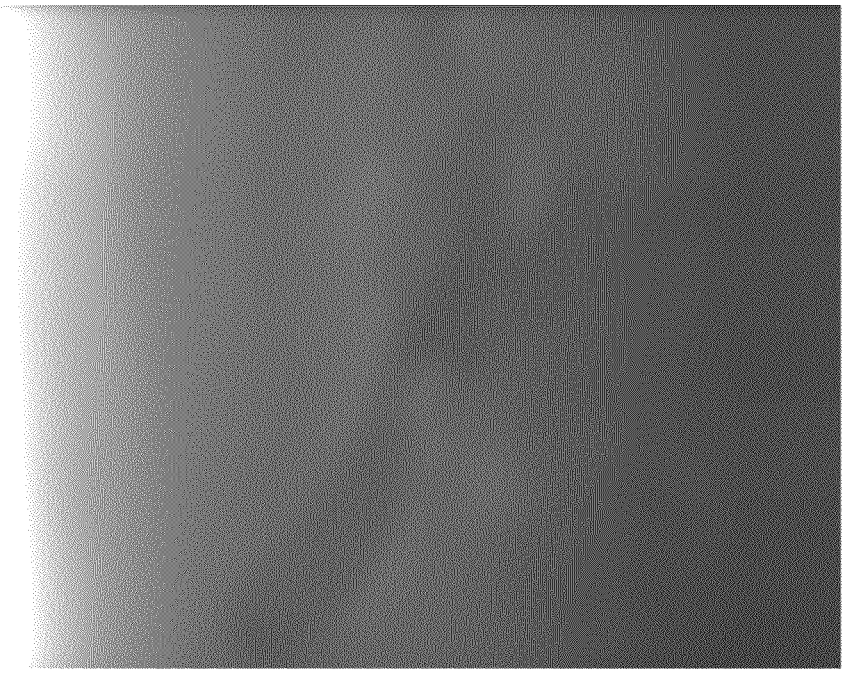
Figure 2D:

For a better illustration, the forward projection of the registered MDCT (FIG. 2(b)) has a full resolution. As seen in FIG. 2(c), the estimated scatter has a very uniform distribution inside or outside the phantom, while the signal increase around the object boundary is significant (by a factor of ~30). This scatter behavior is consistent with previous MC study and scatter measurements.

On a 3.0 GHz PC, the rigid registration of the MDCT image with the first-pass CBCT image required about 10 minutes using ITK. After registration, the scatter estimation for one projection required about 20 seconds in Matlab in the current implementation. Note that the signal processing time could be greatly reduced after standard optimizations.

Evaluations

Two tabletop CBCT systems and phantoms were used in this work. The system and reconstruction parameters are listed in Table I.

TABLE I

Imaging and reconstruction parameters of the tabletop CBCT systems

| | System I | System II |
|---|---|---|
| Imaging parameters: | | |
| scan mode | Full-fan | Half-fan |
| x-ray energy | 120 kVp | 125 kVp |
| x-ray focal spot size | 0.6 mm | 0.4 mm |
| source to detector distance | 1118 mm | 1500 mm |
| source to rotation axis distance | 790 mm | 1000 mm |
| detector size | 400-by-300 mm 1024-by-768 pixels | 400-by-300 mm 1024-by-768 pixels |
| Rotation | circular, 360 deg | circular, 360 deg |
| bow-tie filter | No | 8:1 Al |
| anti-scatter grid | No | 10:1 grid |
| number of views | 800 | 625 |
| Reconstruction parameters: | | |
| reconstruction voxel size | 0.50 mm in all directions | 0.98 mm in all directions |
| reconstruction volume size | 512-by-512-by-340 voxels | 512-by-512-by-156 voxels |
| Algorithm | FDK | Varian Reconstruction Software |

Calphan©600 Phantom Study

A study was carried out on a tabletop CBCT system (system I) at Stanford University using the Calphan©600 phantom. The purpose of the study was to investigate how severe the shading artifacts were if no correction was applied and what was the maximum capability of the algorithm on shading correction without help from additional correction algorithms. Therefore no extra noise suppression and cupping correction (or uniformity correction) were used in the study. The Calphan©600 phantom (The Phantom Laboratory, Salem, N.Y.), with a diameter of 200 mm, was used on system I. The MDCT image was acquired on a GE 4-slice Discovery ST scanner. The size of the MDCT image was 512-by-512-by-184, with the voxel size of 0.55 mm in the axial plane and 1.25 mm in the longitudinal direction. A standard Feldkamp, Davis and Kress (FDK) algorithm was used for the CBCT reconstruction.

Scatter signals are inherently suppressed when the size of irradiated volume in one projection is small. Projections were also acquired using a narrowly opened collimator (a width of ~10 mm on the detector) for the purpose of comparison. Assuming that the scatter signal magnitude is approximately proportional to the size of the illumination, the residual SPR was estimated to be around 0.07. The resulting images were referred to as "fan-beam CT" or reference images.

Pelvis Phantom Study

A second study was performed on another tabletop CBCT system (system II) at Ginzton Technology Center (Varian Medical Systems, Mountain View, Calif.). The geometry of this system exactly matched that of a Varian On-Board Imager (OBI) CBCT system on the Trilogy radiation therapy machine.

An anthropomorphic pelvis phantom, with major and minor axes of approximately 420 mm and 280 mm, was used in the second study on system II. Due to the large size of the phantom, a half-fan scan mode, as available on the Varian OBI system, was used to increase the field of view (FOV), with the detector shifted laterally by 160 mm. An aluminum bowtie filter was equipped to make the photon statistics more uniform across the detector. This experiment setup represented the issues in shading correction on clinical CBCT systems. The SPR was high as the result of a large illumination volume. The scatter artifact patterns also were complicated by the use of the offset detector and the bowtie filter. A Philips 16-slice Precedence MDCT machine was used to acquire the MDCT data of the pelvis phantom. The reconstructed MDCT image had a size of 512-by-512-by-120, with the voxel size of 0.95 mm in the axial plane and 3 mm in the longitudinal direction. To fully test the algorithm, the commercial Varian software was used for the CBCT reconstruction after the shading correction. Note that the Varian reconstruction software contained built-in components such as scatter correction, beam hardening correction and noise suppression. Except the noise suppression, other functionalities were turned off to generate images when the algorithm is applied.

Similar to the study on the Calphan©600 Phantom, a scan with a narrowly-opened collimator was carried out to acquire reference data. A 30 mm collimator opening on the detector was used to obtain more reference slices in the axial direction. An initial scatter estimate was calculated for each projection by subtracting the narrow-collimator projection from the corresponding wide-collimator projection. The resulting estimate was smoothed and extrapolated in the axial direction to cover the entire projection, and scaled by a calibration factor equal to 1.1, determined by Monte Carlo simulations and experimental measurements, to account for residual scatter contained in the narrow-collimator acquisition. The resulting scatter estimate, which was strictly valid in the region of the narrow-collimator acquisition, was then subtracted from the wide-collimator projection to generate the "ground truth" scatter-corrected projection. These ground truth projections were finally beam hardening corrected (method described in the following) and reconstructed using the FDK algorithm to produce pelvis phantom reference images.

Furthermore, the empirical shading correction method was compared against scatter and beam hardening correction methods based on modeling physical properties of the Varian OBI CBCT system. The analytical scatter correction method used an asymmetric kernel and the beam hardening correction performs an analytical calibration on the projection images.

The asymmetric scatter kernel superposition (ASKS) technique was used for scatter correction. For each projection, the x-ray cone-beam was modeled as an array of pencil beams that interact with the object-of-interest. For each pencil beam, a scatter point-spread function (PSF) was determined based on measured attenuation values. The total detected scatter estimate was derived from the cumulative response of each of the scatter PSFs. By using asymmetric and shift-variant scatter PSFs, the method achieved improved results over previously reported scatter kernel superposition (SKS) algorithms. The method was computationally efficient and, for the large pelvis phantom, produces images with CT numbers that are within 5+/−21 (mean+/−standard deviation) HU of the reference fan beam reconstruction.

After scatter correction was performed on the raw projection data, an analytical beam hardening correction was applied to the resulting primary estimates $I_p$ as part of the log normalization process. The corrected line integrals, also called water equivalent thicknesses (WET), were generated for each projection pixel (x,y) using the relationship WET(x, y)=ln($I_0$(x,y)/$I_p$(x,y))/(u($I_0$,$I_p$,x,y)) where $I_0$ is the flood field (i.e. air) projection measurement. The spatially- and intensity-dependent effective linear attenuation coefficient u($I_0$,$I_p$, x,y) of water was determined using analytical models of the x-ray tube beam spectrum, beam line filtration, and detector response. A key feature of the algorithm is that it allows for correction of primary beam hardening caused by the aluminum bowtie filter, which can be a major contributor to shading artifacts in reconstructed images. The beam hardening correction was applied for both the ASKS and reference (i.e. narrow-collimator) reconstructions.

Image quality metrics . . . . Besides side-by-side image comparisons, quantitative analysis was carried out to evaluate the performance of the method. The reconstructed image values were presented in HU. For the selected ROIs, the error of CT number was calculated as the square root of the mean square error (RMSE), defined as $$RMSE = \sqrt{\frac{1}{N}\sum_{i=1}^{N}(\mu_i - \bar{\mu}_i)^2} \qquad \text{Eqn. (1)}$$

where i is the index of the ROI, $\mu_i$ is the mean reconstructed value in HU inside the ROI, $\bar{\mu}_i$ is the corresponding value measured in the reference image, and N is the total number of ROIs.

The image contrast was calculated as $$\text{contrast}=|\mu_r - \mu_b| \qquad \text{Eqn. (2)}$$

where $\mu_r$ is the mean reconstructed value inside the ROI and $\mu_b$ is the mean reconstructed value in the surrounding area.

The standard deviation (STD) of CT number in a uniform ROI of the CBCT image was used to determine the noise level, and it is defined as $$STD = \left[\frac{1}{M-1}\sum_{j=1}^{M}(\mu_j - \bar{\mu})^2\right]^{\frac{1}{2}} \qquad \text{Eqn. (3)}$$

where j is the pixel index, $\mu_j$ is the CT number of each pixel, $\bar{\mu}$ is the mean value of the ROI, and M is the total number of pixels in the selected ROI.

The contrast-to-noise ratio (CNR) was calculated as $$CNR = \frac{|\mu_r - \mu_b|}{\sigma} \qquad \text{Eqn. (4)}$$

where $\mu_r$ is the mean reconstructed value inside the ROI, $\mu_b$ is the mean reconstructed value in the surrounding area and $\sigma$ is the STD inside the ROI.

Results

Calphan©600 Phantom Study

Figure 3A:
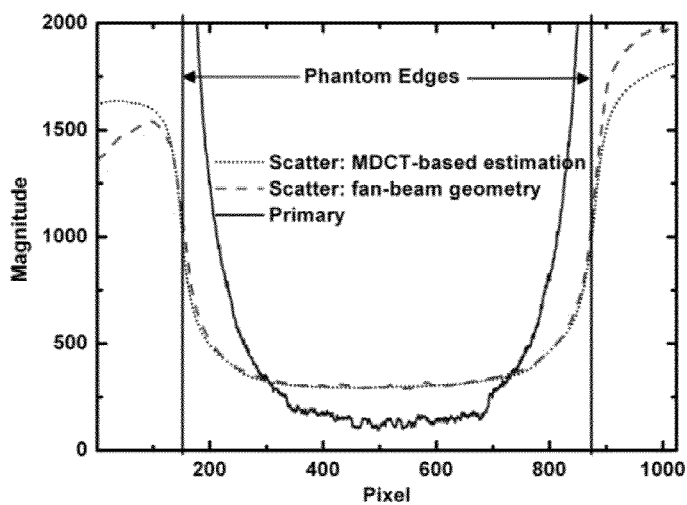
FIGS. 3(a), 3(b) and 3(c) are diagrams of 1-D horizontal profiles of the scatter, primary signal, line integrals and SPR (scatter to primary signal ratio) for the Calphan© 600 phantom using the present invention.
Figure 3B:
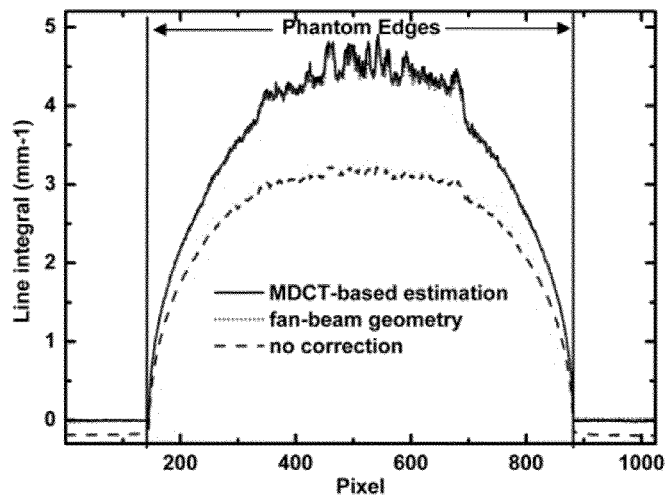
Figure 3C:
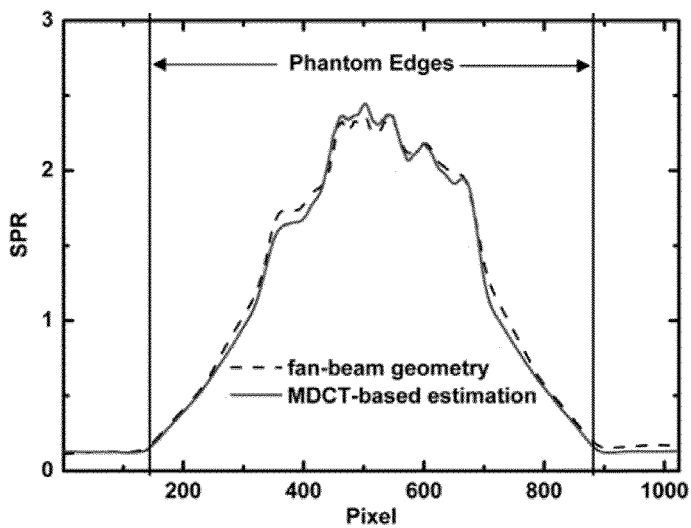

FIGS. 3(a), 3(b) and 3(c) are diagrams of 1-D horizontal profiles of the scatter, primary signal, line integrals and SPR (scatter to primary signal ratio) for the Calphan© 600 phantom: (a) estimated and measured scatter, primary signals; (b) line integrals of CBCT projections with and without the correction and with a fan-beam geometry; (c) measured SPR using the fan-beam geometry and estimated SPR using the algorithm. The vertical solid lines indicate the edges of the phantom. FIGS. 3(a) and 3(b) show the central horizontal 1D profiles of scatter and primary signals, and line integrals of one projection on the Calphan©600 phantom. The measured scatter was obtained by subtracting the fan-beam projection from the cone-beam projection in the illuminated detector area. No anti-scatter grid was equipped in this study. The SPR was calculated as approximately 2.4 around the phantom center. In FIG. 3(a), the estimated scatter profile using the method matches well with the measured result in the central region pixels (200-800). Large deviations were found around and outside the phantom boundary. Nonetheless, the primary signals in these areas were high, which led to a negligible estimation error of SPR (see FIG. 3(c)). These errors in scatter estimation held little influence on the accuracy of estimated line integrals and therefore the reconstructed image. As seen in FIG. 3(b), the values of line integrals were greatly enhanced by the method and are very close to the fan-beam result across the detector.

Figure 5:
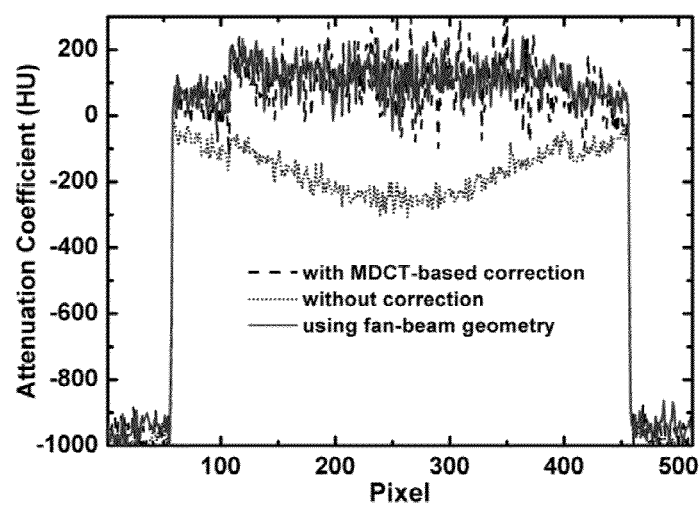
FIG. 5 is a diagram of the 1-D horizontal profiles of the reconstructed Calphan© 600 phantom using the present invention.
Figures 6, 6B, 6C:
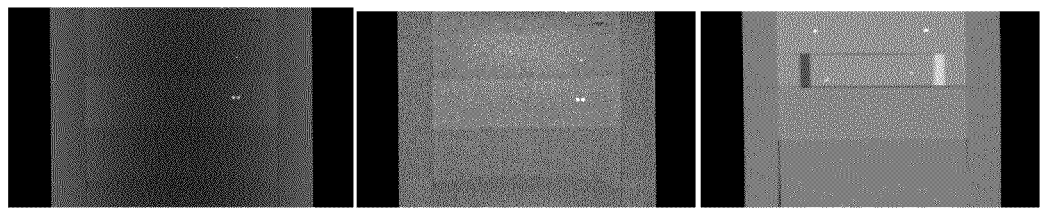

The effects of the shading correction on the reconstructed images were shown in FIGS. 4(a), 4(b), 4(c), 4(d), 5 and 6(a), 6(b), and 6(c). FIGS. 4(a), 4(b), 4(c), and 4(d) display axial views of the reconstructed Calphan© 600 phantoms. Display window: [−700, 1300] HU: (a) CBCT without correction; (b) CBCT with the scatter correction; (c) Fan-beam CT; (d) The corresponding slice of MDCT used in the correction for (a). In the selected ROIs (marked with solid white rectangles), the average CT numbers for (a), (b) and (c) are −230, 122 and 118 HU, and the STDs are 25, 78 and 48 HU, respectively. FIG. 5 shows the 1-D horizontal profiles of the reconstructed Calphan© 600 phantom. FIGS. 6(a), 6(b), and 6(c) displays the sagittal views of the reconstructed Calphan© 600 phantoms. Display window: [−500, 500] HU; (a) CBCT image without correction; (b) CBCT image with the proposed shading correction; (c) Registered MDCT image used in the proposed algorithm.

To simulate the patient deformation in clinical practice, the inserts of the Calphan©600 phantom were arranged in the MDCT and CBCT scans. The fan-beam CT image (FIG. 4(c)) had a much improved quality as compared to the CBCT image (FIG. 4(a)), which indicated that most of the CBCT shading artifacts in this study result from scatter signals. The method significantly suppressed the severe shading artifacts present in the scatter uncorrected images (see FIGS. 4(a) and 6(a)). The image quality after the scatter correction was comparable to that of a fan-beam CT, which was evident in the comparisons of images (FIGS. 4(b) and 4(c)) and 1D profiles (FIG. 5). Using the fan-beam CT image as a "scatter-free" reference, in the selected ROIs shown as solid rectangles in FIG. 4, the method reduces the CT number error from 348 HU to 4 HU, at the expense of STD increase from 25 HU to 78 HU. It should be emphasized that the noise increase in the scatter corrected image does not only pertain to our method. Due to the random nature of the scatter events, it was impossible to eliminate the scatter noise using a post-processing algorithm. The scatter noise was therefore left in the scatter corrected image, and an image noise increase was expected for all post-processing scatter correction algorithms. If the image noise increased to an unacceptable level, an additional noise suppression algorithm could be used together with the scatter correction. In the study on the Calphan©600 phantom, no noise suppression was implemented. Zoom-in inserts of the line pairs, which were marked with dashed rectangles in FIGS. 4(a), 4(b) and 4(c), are shown at the bottom right corner of each figure. Inspection of these line pairs also revealed that the method does not impair the image resolution, although smoothing techniques are used on the scatter estimation.

As seen in FIGS. 4(a), 4(b), 4(c), 4(d), 6(a), 6(b), and 6(c), due to rearrangement of phantom inserts, the geometries of the CBCT image and the MDCT image used in the CBCT correction could be exactly matched in spite of image registration. Nonetheless, the geometry mismatch had little influence on the scatter correction accuracy of the method. These results indicate that the method could tolerate large high-frequency errors in the registration. Since a high MDCT registration accuracy was hardly achievable in the presence of patient deformation and CBCT artifacts, the approach showed an advantage over the existing methods of "calibrating" the CBCT image based on the registered MDCT. The performances of the calibration methods were mainly determined by the registration accuracy. When an accurate deformable registration is impossible, these methods failed to provide all the geometrical information contained in the CBCT image. For example, as seen in FIGS. 4(a) and 4(d), modifying the MDCT image via deformable registration could achieve an improved CBCT without losing the line-pair structures. The shading correction algorithm still achieved improved CBCT images.

Figures 7A, 7B:
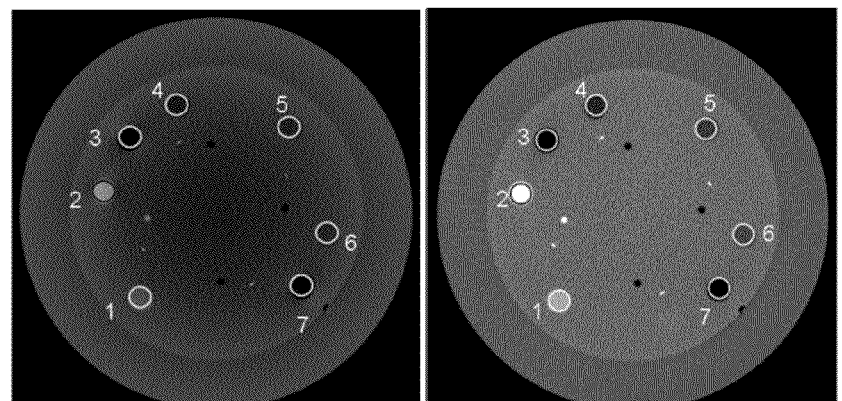
FIGS. 7(a) and 7(b) are displays of the axial views of the reconstructed Calphan© 600 phantoms for CT number analysis of the contrast rods using the present invention.

As scatter can cause severe contrast reduction, the artifacts were more prominent around high-contrast objects. For further quantitative evaluation of the shading correction performance using the method, the average CT numbers, contrasts, STDs and CNRs were calculated for the contrast rods in one of the phantom inserts, as indicated in FIGS. 7(a) and 7(b). FIGS. 7(a) and 7(b) display of the axial views of the reconstructed Calphan© 600 phantoms for CT number analysis of the contrast rods. Display window: [−500, 500] HU; (a) CBCT without correction; (b) CBCT with the proposed shading correction. ROIs used in the analysis are indicated in the figure.

The results are summarized in Table II, using values obtained from a fan-beam CT geometry as the references. In the selected ROIs, the method reduced the RMSE from 375 HU to 17 HU, and the contrast was increased by a factor of 3.3 on the average. Due to the image noise increase after scatter correction, an increase of the CNR was not guaranteed.

Pelvis Phantom Study

The difficulty of scatter correction increased as the object size and heterogeneity increased. To further evaluate the approach, a large-size pelvis phantom was used in the second study on a tabletop system with a geometry matching that of the Varian OBI CBCT system. The system operated in the half-fan scan mode, with a bow-tie filter mounted on the outside of the x-ray collimator as described in Table I. The phantom contained bone, soft-tissue and low-contrast object structures. With use of the bowtie and the anti-scatter grid, the measured SPR around the phantom center varies from ~1.0 in the AP views to ~2.3 in the lateral views.

An example of processed projection images on the pelvis phantom is shown in FIGS. 2(a), 2(b), 2(c) and 2(d) in the method section. FIGS. 8(a), 8(b), 8(c) and 8(d) display the image reconstructions of the pelvis phantom. Display window: [−285 165] HU. (a) CBCT without correction; (b) CBCT with the proposed MDCT-based shading correction (the white arrow points to the residual blooming artifacts); (c) CBCT with the ASKS scatter correction and analytical beam hardening correction; (d) CBCT with the narrow-collimator geometry and analytic beam hardening correction (the white arrow points to the low-contrast insert). The measured contrast values for the low-contrast insert in each figure are (a) 5 HU; (b) 31 HU; (c) 24 HU; and (d) 27 HU. The standard deviations are (a) 15 HU; (b) 30HU; (c) 30 HU; and (d) 31 HU. The CNRs are (a) 0.33; (b) 1.03; (c) 0.8; (d) 0.9. Here, FIGS. 8(a), 8(b), 8(c) and 8(d) showed the axial views of the reconstructed volumes without and with the shading correction, with the ASKS scatter correction and beam hardening correction, and with the narrow-collimator reference correction (a fan-beam CT geometry) and beam hardening correction. FIGS. 9(a) and 9(b) showed sagittal and coronal views of the reconstructed pelvis phantoms with and without the shading correction. Display window: [−285 165] HU: (a) No correction and (b) corrected using the present invention. Severe shading artifacts were seen in the uncorrected images (FIGS. 8(a) and 9(a)), having complicated pattern partly related to the use of the bowtie filter and the offset detector.

TABLE II

Comparison of the average reconstruction values, contrasts, STDs (in HU) and CNRs inside the contrast rods of the Catphan ©600 phantom.

| | ROI | 1 | 2 | 3 | 4 | 5 | 6 | 7 | RMSE |
|---|---|---|---|---|---|---|---|---|---|
| CT # | Fan-beam CT | 368 | 959 | −955 | −160 | −67 | −12 | −951 | |
| | CBCT with correction | 347 (−21) | 983 (24) | −949 (6) | −166 (−6) | −78 (−11) | −30 (−18) | −930 (21) | 17 |
| | CBCT without correction | 6 (−362) | 239 (−720) | −569 (−386) | −215 (−55) | −176 (−109) | −158 (−146) | −563 (−388) | 375 |
| | CT# improvement | 341 | 744 | 380 | 49 | 98 | 128 | 367 | |
| Contrast | CBCT with correction | 248 | 885 | 1047 | 264 | 176 | 129 | 1028 | |
| | CBCT without correction | 147 | 381 | 428 | 74 | 35 | 21 | 421 | |
| | Contrast Increase Ratio | 1.7 | 2.3 | 2.4 | 3.6 | 5.0 | 6.1 | 2.4 | |
| STD | CBCT with correction | 53 | 71 | 47 | 54 | 60 | 56 | 45 | |
| | CBCT without correction | 29 | 29 | 24 | 24 | 22 | 25 | 22 | |
| CNR | CBCT with correction | 4.7 | 12.5 | 22.3 | 4.9 | 2.9 | 2.3 | 22.8 | |
| | CBCT without correction | 5.1 | 13.1 | 17.8 | 3.1 | 1.6 | 0.8 | 19.1 | |
| | CNR Increase Ratio | 0.9 | 0.9 | 1.2 | 1.6 | 1.8 | 2.7 | 1.2 | |

The CT number errors are also shown in parentheses.

The challenge of shading correction in this study was also seen in FIG. 8(*d*). With the narrow-collimator geometry and the beam hardening correction, residual artifacts were still observed in the reference image. The dark annular band situated towards the periphery of the object in FIG. 8(*d*) (also known as the "radar artifact") was believed to be largely due to detector lag and gain changes caused by charge trapping in the amorphous silicon detector. This artifact may also have been partially caused by uncorrected bowtie beam hardening effects and residual scatter in the reference projections.

FIGS. 8(*b*) and 9(*b*) illustrate the significant image quality improvements obtained using the method. Image shading and distortion were greatly suppressed. An elliptical area inside the low-contrast insert was selected as the ROI in the contrast calculation, and a small elliptical ring surrounding the insert was used as the background. The method increased the image contrast of the low-contrast object from 5 HU in the uncorrected image to 31 HU. Different from the Calphan©600 phantom study, the Varian software was used here for reconstruction, which includes strong noise suppression. The contrast increase after the correction therefore led to a CNR increase by a factor of 3.1. The low-contrast object can be more clearly identified as shown in FIG. 8(*b*). Compared to the ASKS plus beam hardening corrections, this approach reduced image distortions near the object center and results in greater overall uniformity. Note that residual blooming artifacts from bone and other high contrast structures are present in the corrected image. These artifacts stem from the high-contrast registration errors of the MDCT image, which were left in the projection after the low-pass filtering in the shading correction. To keep the high-frequency content of the scatter distribution (especially around the object boundary), the cut-off frequency of the low-pass filter cannot be very low. Nevertheless, the overall improved image quality provided by the method indicated that the algorithm corrected for a variety of low frequency artifacts from multiple sources including scatter, beam hardening and charge trapping.

Figure 10A:
FIGS. 10(a) and 10(b) are displays of the scatter corrections of the present invention using MDCT images with different deformations on the low-contrast inserts using the present invention.

To investigate the effects of registration errors on the correction performance of the method, we also manually distorted the geometry of the low-contrast insert in the MDCT images to mimic the patient deformable registration errors between the MDCT and CBCT scans. FIG. 10 displays the scatter corrections of the present invention using MDCT images with different deformations on the low-contrast inserts. Display window: [−285 165] HU. (a) MDCT images (white arrows indicate the low-contrast inserts). Top row: no deformation; middle row: 1 cm deformation; Bottom row: 2 cm deformation. (b) corresponding corrected CBCT images using the present invention (The arrow at the bottom points to the artifacts due to scatter estimation errors around the object boundary). The measured contrast values for the low-contrast insert in CBCT images are: top) 31 HU; middle) 30 HU; and bottom) 29 HU. The standard deviations are top) 30 HU; middle) 30HU; and bottom) 31 HU. The CNRs are top) 1.03; middle) 1.00; and bottom) 0.94. As shown in FIG. 10(*a*), 1 cm and 2 cm deformations were created on the MDCT data. The low-contrast insert in the MDCT image was manually transformed in three dimensions to simulate the deformation in clinical applications. These geometry mismatches were expected in practice, since an accurate deformable registration was difficult to achieve on the low-contrast objects (see FIG. 8(*a*)). FIG. 10(*b*) shows the CBCT images after shading correction. This method maintained superior performance when the registration error (i.e. the created deformation) was small (≤1 cm). Also, the filtering parameters of the smoothing kernel used in the small deformation error study (middle row of FIGS. 10(*a*) and 10(*b*)) were the same as that without deformation (top row of FIGS. 10(*a*) and 10(*b*)). This fact indicated that the performance of our shading correction algorithm was insensitive to the choice of filter parameters to a certain extent. As the registration error got larger (2 cm), stronger low-pass filtering (Gaussian filtering with a standard deviation of 21 pixels (8.1 mm)) needed to be used to suppress errors in the primary estimate of the CBCT projections. However, as shown in the images in the bottom row of FIGS. 10(*a*) and 10(*b*), at the places where the true scatter signals have large high-frequency components, such as object boundaries, the stronger filtering process also removed high-frequency components of scatters and results in scatter estimation errors which lead to the large image artifacts. Nonetheless, the geometry of the low-contrast insert could still be accurately identified using the shading correction. It note that the blooming artifacts around bones, also due to registration errors, were suppressed by the strong low-pass filtering. Similar to the Calphan©600 results, these pelvis images indicated that the shading correction could tolerate registration errors and therefore has an advantage over the existing "calibration-based" correction methods.

Discussion

Scatter contamination has been identified as a fundamental limitation of CBCT image quality along with other nonlinearities. Because high-quality MDCT images of all radiation therapy patients are acquired for treatment planning, and these provide a source of "free" knowledge to improve CBCT imaging accuracy. One way to estimate the CBCT scatter signals from the MDCT image is to use MC simulation, which computationally intense. A more efficient scatter estimation algorithm as disclosed in the method was based on the fact that the scatter signals have dominant low-frequency components, while the geometric differences between the registered MDCT image and the CBCT image largely lead to high-frequency primary differences in the projection domain. The method involved forward projection of the MDCT image, standard image registration and smoothing steps. Although scatter was the source of projection errors in the algorithm derivation, the shading correction method provided more than just scatter correction. The algorithm accurately estimated all low-frequency errors in the CBCT projections, it also effectively corrected for low-frequency components of other errors from beam hardening effects, detector lag and detector non-linear gain.

Most of the algorithm steps were implemented in Matlab and the calculation was not optimized. The computational cost was acceptable for an off-line use of CBCT, such as dose verification and adaptive re-planning. Another improvement to the computational efficiency can be to convert Matlab code into more efficient languages such as, e.g. C. After optimizations, the processing time for one CBCT dataset can be within 30 minutes. The increased computation of this method can mainly occur in the additional CBCT reconstruction and the forward projection on the MDCT. These processes can be significantly sped up using parallel computation or hardware-based acceleration.

The use of planning MDCT to improve the CBCT image quality is not a completely new idea. But, this method however, is distinct from other published MDCT-based methods, which "improve" the CBCT image quality by modifying the MDCT image via deformable registration and replacing the CBCT image by the registered MDCT. Instead of relying on the MDCT for providing anatomic details at the treatment time, limited patient information of the MDCT image can be used in the shading correction of the method. The merit of treatment monitoring using CBCT can therefore be retained.

Figure 10B:
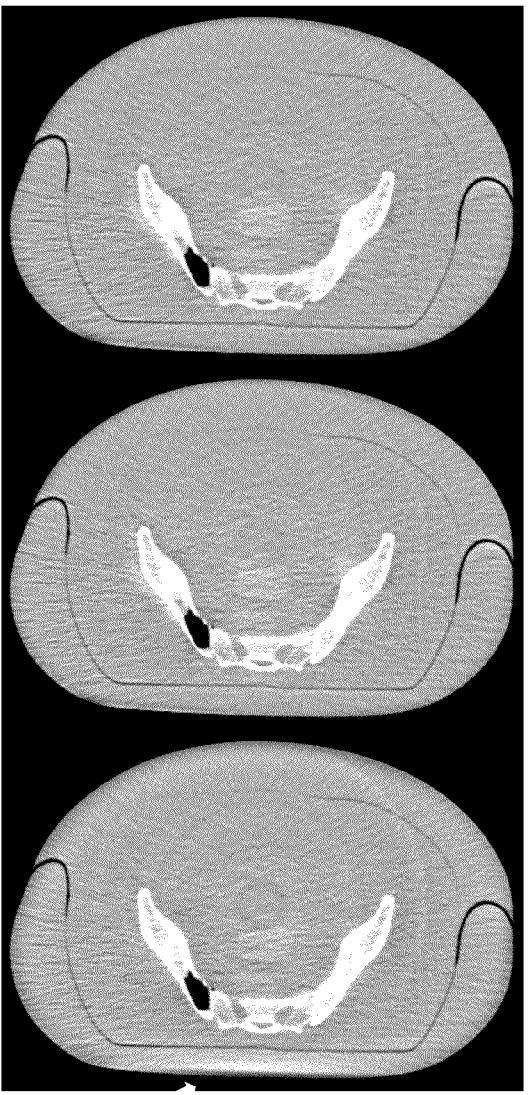

The performance of the algorithm can mainly be determined by the smoothing step of generating the error estimates, where most parameter adjustment occurred. This step can remove the high-frequency errors between the estimated and the raw CBCT primary projections while leaving the low-frequency scatter signals intact. Strong smoothing can be preferred when errors in the primary signals are large due to inaccurate registration. On the other hand, although scatter distribution can be, in general, smooth if statistical noise is not considered, it still can contain relatively high-frequency components at sharp transitions of primary signals. Over-smoothing can cause image distortions at high-contrast locations, such as object boundaries as shown in FIG. 10(b).

Rigid image registration was implemented on planning MDCT images in the current phantom studies. The results on the Calphan©600 phantom and the pelvis phantom with manual deformations indicate that the method can tolerate some image registration errors. In clinical practice, however, rigid registration of the patient images may lead to a large registration error. Therefore, deformable registration can be implemented to reduce the image registration error such that the effect of mis-registration can be minimized in the images after shading correction.

The tabletop system had a geometry equivalent to that of the clinical CBCT system, except without a patient bench. In clinical implementation of the method, the bench can be included in the CBCT projections but not simulated in the MDCT forward projections, which can cause errors in the scatter estimation. The patient bench CBCT projections can be acquired before each patient scan and the effect removed by subtracting the bench projections from the patient projections. Alternatively, the radiation therapy patient bench can be inserted into the MDCT reconstructed volume and then the forward projection operations can be performed.

A general problem for all post-processing scatter correction algorithms can be the scatter noise remaining in the projections after the correction, resulting in a noise level increase in the reconstructed image. Although the increased image noise could potentially compromise the performance of the method, it can be effectively suppressed by many existing algorithms, such as the penalized weighted least-square (PWLS) algorithm developed previously. In the pelvis phantom study, the commercial Varian software was used for reconstruction, which included strong noise suppression. The benefits of the correction were therefore fully achieved, as demonstrated by the CNR increase. Noise suppression can lead to image spatial resolution loss. Nonetheless, in many CBCT applications of radiation therapy, such as dose calculation, CT number accuracy can generally be more important than spatial resolution.

CONCLUSION

The method describes a scatter correction method for on-board CBCT in radiation therapy using the planning MDCT as prior knowledge. The performance of the method was demonstrated using two phantom studies on tabletop systems. On the Calphan©600 phantom, the method reduced the reconstruction error from 348 HU to 4 HU around the object center and from 375 HU to 17 HU in the high-contrast regions. In the selected ROIs, the average image contrast was increased by a factor of 3.3. When additional noise suppression was implemented, this contrast increase led to a CNR increase, as seen in the results of the pelvis phantom. Low-contrast objects representing tumors, which can be otherwise buried in the shading artifacts, can be more clearly identified after the shading correction. Besides the high shading correction efficacy, the method had several advantages including no dose or scan time increase, no modification of the existing imaging hardware or protocols.

The high CT number accuracy of CBCT achieved by the method can have several advantages, particularly clinical situations. First, improved CBCT imaging quality can increase patient setup accuracy; second, CBCT-based dose calculation can become a viable and accurate approach for dose verification; third, tumor location at treatment time can be precisely determined using CBCT-based tumor delineation; fourth, the calculated "dose of the day" using accurate CBCT images can provide essential feedback information used in the regressive loops of most adaptive radiation therapy algorithms, and CBCT-based treatment re-planning can be readily implementable. As such, our approach appears to be very attractive in the current clinical applications of radiation therapy.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of this disclosure have been described in detail with particular reference to exemplary embodiments, those skilled in the art will understand that variations and modifications can be effected within the scope of the disclosure as defined in the appended claims. Accordingly, the scope of the various embodiments of the present invention should not be limited to the above-discussed embodiments, and should be defined only by the following claims and all equivalents.

What is claimed is:
1. A correction method for reducing error in cone beam computed tomography images, the method comprising:
generating a plurality of two-dimensional projection images of a subject from a three-dimensional multi-detector computed tomography image of the subject, which is spatially registered with a three-dimensional cone beam computed tomography image of the subject;
subtracting the plurality of two-dimensional projection images from a plurality of two-dimensional cone beam projection images of the subject, resulting in a plurality of two-dimensional estimated error projections, which comprise an estimated error in the plurality of two-dimensional cone beam projection images;
subtracting the plurality of two-dimensional estimated error projection images from the plurality of two-dimensional cone beam projection images to generate a plurality of two-dimensional corrected cone beam projection images;
constructing a three-dimensional corrected cone beam computed tomography image of the subject from the plurality of two-dimensional corrected cone beam projection images;
converting the three-dimensional multi-detector computed tomography image of the subject from Hounsfield Units to linear attenuation coefficients; and
spatially registering the converted three-dimensional multi-detector computed tomography image of the subject before generating the plurality of two-dimensional multi-detector projection images of the subject, wherein the spatially registering comprises:

placing a data set from the converted three-dimensional multi-detector computed tomography image of the subject in a same coordinate system as a data set from the three-dimensional cone beam computed tomography image of the subject; and aligning a center of mass of the converted three-dimensional multi-detector computed tomography image of the subject with a center of mass of the three-dimensional cone beam computed tomography image of the subject.

2. The method of claim 1, wherein the estimated error in the plurality of two-dimensional cone beam projection images comprises low-frequency scattered radiation signals, beam hardening effects, detector lag, and/or detector nonlinear gain.

3. The method of claim 1, further comprising smoothing the plurality of two-dimensional estimated error projections before generating the plurality of two-dimensional corrected cone beam projection images, wherein the smoothing comprises suppressing any boundary discrepancies in the plurality of two-dimensional estimated error projections.

4. The method of claim 3, wherein the smoothing further comprises reducing a high-frequency component of the estimated error.

5. The method of claim 4, wherein the high-frequency component of the estimated error comprises error in spatial registration resulting from a deformation or change in the subject.

6. The method of claim 1, wherein the three-dimensional cone beam computed tomography image of the subject is formed from the plurality of two-dimensional cone beam projection images of the subject using a Feldkamp, Davis, and Kress algorithm.

7. The method of claim 1, wherein the spatially registering further comprises:
calculating a square pixel-wise difference between a volume of the converted three-dimensional multi-detector computed tomography image of the subject with a volume of the three-dimensional cone beam computed tomography image of the subject;
applying a gradient descent search algorithm to the square pixel-wise difference to determine an amount of rotation and offset for the converted three-dimensional multi-detector computed tomography image of the subject; and
rotating and offsetting the converted three-dimensional multi-detector computed tomography image of the subject by the amount determined.

8. The method of claim 7, wherein the spatially registering further comprises:
repeating the calculating, applying, and rotating and offsetting steps of claim 1 until the amount determined is below a threshold amount.

9. The method of claim 1, wherein the generating the plurality of two-dimensional multi-detector projection images of the subject comprises using Siddon's algorithm and Beer's Law.

10. The method of claim 1, wherein the three-dimensional corrected cone beam computed tomography image of the subject is constructed from the plurality of two-dimensional corrected cone beam projection images of the subject using a Feldkamp, Davis, and Kress algorithm.

11. The method of claim 1, further comprising using the three-dimensional corrected cone beam computed tomography image of the subject as an image for image-guided radiation therapy.

12. A correction method for reducing error in cone beam computed tomography images, the method comprising:
generating a plurality of two-dimensional projection images of a subject from a cone beam computed tomography scan of the subject;
constructing a three-dimensional cone beam computed tomography image of the subject from the plurality of two-dimensional cone beam projection images;
spatially registering a three-dimensional multi-detector computed tomography image of the subject with the three-dimensional cone beam computed tomography image of the subject;
generating a plurality of two-dimensional projection images of the subject from the three-dimensional multi-detector computed tomography image of the subject;
subtracting the plurality of two-dimensional multi-detector projection images from the plurality of two-dimensional cone beam projection images to generate a plurality of two-dimensional estimated error projections, wherein the plurality of two-dimensional estimated error projections comprise an estimated error in the plurality of two-dimensional cone beam projection images;
low-pass filtering the plurality of two-dimensional estimated error projections;
subtracting the plurality of low-pass filtered two-dimensional estimated error projection images from the plurality of two-dimensional cone beam projection images to generate a plurality of two-dimensional corrected cone beam projection images; and
constructing a three-dimensional corrected cone beam computed tomography image of the subject from the plurality of two-dimensional corrected cone beam projection images,
wherein spatially registering the three-dimensional multi-detector computed tomography image of the subject with the three-dimensional cone beam computed tomography image of the subject comprises:
placing a data set from the three-dimensional multi-detector computed tomography image of the subject in a same coordinate system as a data set from the three-dimensional cone beam computed tomography image of the subject;
aligning a center of mass of the three-dimensional multi-detector computed tomography image of the subject with a center of mass of the three-dimensional cone beam computed tomography image of the subject;
calculating a square pixel-wise difference between a volume of the three-dimensional multi-detector computed tomography image of the subject with a volume of the three-dimensional cone beam computed tomography image of the subject;
applying a gradient descent search algorithm to the square pixel-wise difference to determine an amount of rotation and offset for the three-dimensional multi-detector computed tomography image of the subject;
rotating and offsetting the three-dimensional multi-detector computed tomography image of the subject by the amount determined; and
repeating the calculating, applying, and rotating and offsetting until the amount determined is below a threshold amount.

13. The method of claim 12, further comprising:
smoothing the plurality of two-dimensional estimated error projections before generating the plurality of two-dimensional corrected cone beam projection images;
wherein the smoothing comprises:

suppressing any boundary discrepancies in the plurality of two-dimensional estimated error projections; and reducing a high-frequency component of the estimated error, wherein the high-frequency component of the estimated error comprises error in spatial registration resulting from a deformation or change in the subject.

14. The method of claim 12, wherein the three-dimensional cone beam computed tomography image of the subject is constructed from the plurality of two-dimensional cone beam projection images of the subject using a Feldkamp, Davis, and Kress algorithm and/or wherein the three-dimensional corrected cone beam computed tomography image of the subject is constructed from the plurality of two-dimensional corrected cone beam projection images of the subject using a Feldkamp, Davis, and Kress algorithm.

15. The method of claim 12, further comprising converting the three-dimensional multi-detector computed tomography image of the subject from Hounsfield Units to linear attenuation coefficients before spatially registering the three-dimensional multi-detector computed tomography image of the subject with the three-dimensional cone beam computed tomography image of the subject.

16. The method of claim 12, wherein the generating the plurality of two-dimensional multi-detector projection images of the subject from the three-dimensional multi-detector computed tomography image of the subject comprises using Siddon's algorithm and Beer's Law.

17. The method of claim 12, further comprising using the three-dimensional corrected cone beam computed tomography image of the subject as an image for image-guided radiation therapy.

* * * * *